United States Patent
Asano et al.

(10) Patent No.: US 6,831,995 B1
(45) Date of Patent: Dec. 14, 2004

(54) METHOD FOR DETECTING A DEFECT IN A PIXEL OF AN ELECTRICAL DISPLAY UNIT AND A METHOD FOR MANUFACTURING AN ELECTRICAL DISPLAY UNIT

(75) Inventors: Toshio Asano, Hiroshima (JP); Kaoru Sakai, Yokohama (JP); Jun Mochizuki, Fujisawa (JP); Tatsuo Horiuchi, Chigasaki (JP); Hirofumi Nakatoyodome, Mobara (JP); Tadashi Furukawa, Chiba (JP); Atsuo Ohsawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/520,842

(22) Filed: Mar. 8, 2000

(30) Foreign Application Priority Data

Mar. 23, 1999 (JP) ........................................... 11-077499

(51) Int. Cl.[7] .................................................. G06K 9/00
(52) U.S. Cl. ....................... 382/141; 382/149; 382/274; 382/298; 348/92; 348/180; 345/87; 345/698
(58) Field of Search ................................. 382/141, 264, 382/280, 149, 147, 145, 151, 173, 169, 298; 349/187, 32, 192; 348/92, 93, 181, 130, 135, 143, 190, 187, 184, 180, 177; 345/87, 33, 30, 50, 61, 62, 65, 92, 104, 690, 698, 208, 156

(56) References Cited

U.S. PATENT DOCUMENTS

| | | | | |
|---|---|---|---|---|
| 4,943,732 A | * | 7/1990 | Economou | 250/559.46 |
| 5,095,365 A | * | 3/1992 | Takatoo et al. | 348/143 |
| 5,173,788 A | * | 12/1992 | Ohta | 382/264 |
| 5,377,279 A | * | 12/1994 | Hanafusa et al. | 382/141 |
| 5,537,145 A | * | 7/1996 | Miseli | 348/181 |
| 5,748,768 A | * | 5/1998 | Sivers et al. | 382/130 |
| 6,124,884 A | * | 9/2000 | Fujii et al. | 348/93 |
| 6,215,895 B1 | * | 4/2001 | Sali et al. | 382/141 |
| 6,256,066 B1 | * | 7/2001 | Yukawa et al. | 348/340 |

FOREIGN PATENT DOCUMENTS

| | | |
|---|---|---|
| JP | 8 178797 | 7/1996 |
| JP | 08-178797 | 7/1996 |
| JP | 8 338787 | 12/1996 |

* cited by examiner

Primary Examiner—Bhavesh M. Mehta
Assistant Examiner—Sheela Chawan
(74) Attorney, Agent, or Firm—Antonelli, Terry, Stout & Kraus, LLP

(57) ABSTRACT

In image-capture inspection of electronic displays, the object of the present invention is to reduce moire generation, improve inspection precision by making pixel defects easier to discover, and allowing quantitative evaluation of these pixel defects.

The relative positioning of the electronic display and an imaging element is changed by very small amounts of 1/n of the pixel pitch. The n images are arranged by pixel and the images are combined by taking the moving average of the image data values to reduce the image-capture moires generated during the image capture operations. The composite image is used to inspect pixel defects in the electronic display.

18 Claims, 23 Drawing Sheets

$$\text{defect contrast} = \frac{V_1 - V_2}{V_1} \times 100\% \quad \ldots (\text{Equation 1})$$

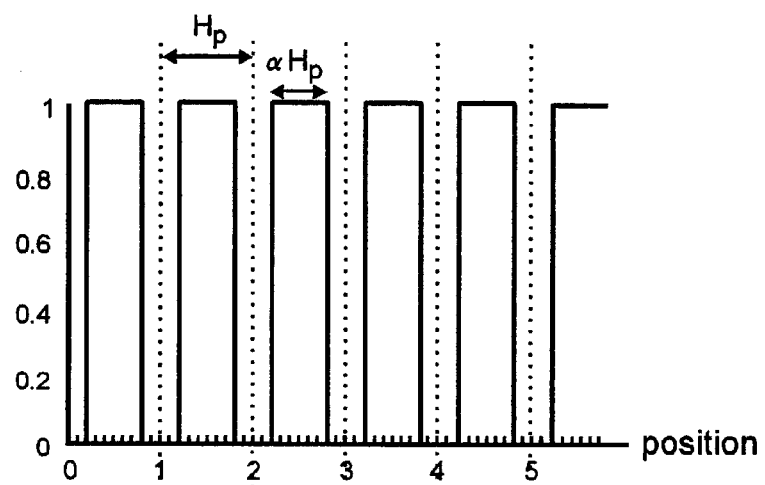
FIG.15 (a) Light emission strength of display pixel
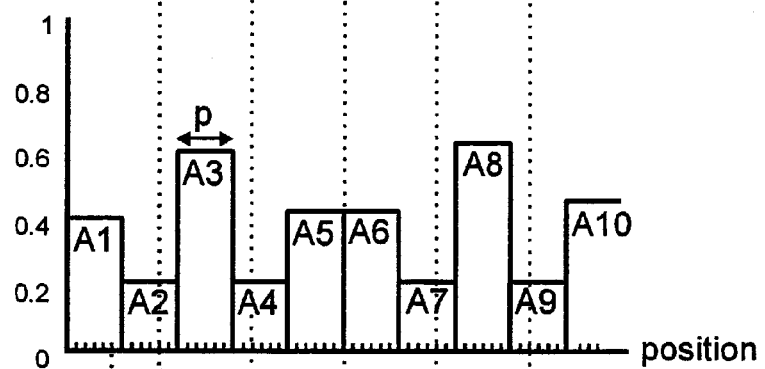
FIG.15 (b) acquired pixel value
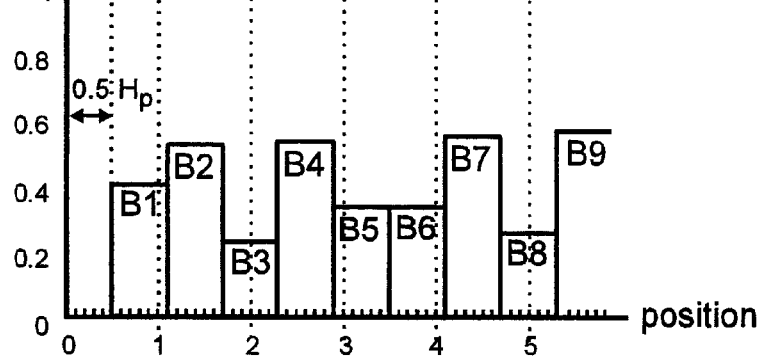
FIG.15 (c) acquired pixel value with 1/2 pitch offset
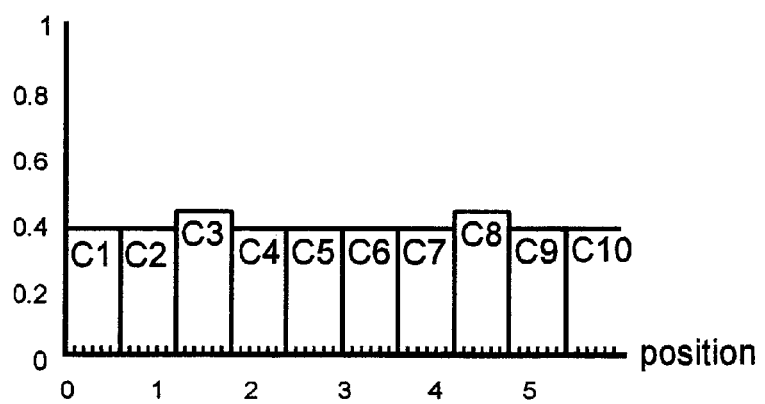
FIG.15 (d) composite acquired pixel value

METHOD FOR DETECTING A DEFECT IN A PIXEL OF AN ELECTRICAL DISPLAY UNIT AND A METHOD FOR MANUFACTURING AN ELECTRICAL DISPLAY UNIT

FIELD OF THE INVENTION

The present invention relates to a method for detecting a defect in a pixel of an electrical display unit and a method for manufacturing an electrical display unit. More specifically, the present invention relates to: a method for inspecting pixel defects where images are captured from plasma displays or cathode-ray tubes in which defect inspection is made easier and inspection precision is improved, thus allowing quantitative evaluation of these defects; and a method for manufacturing electronic display apparatus that allow easy correction of defects.

BACKGROUND OF THE INVENTION

Representative examples of electronic displays of the self-emission type include cathode-ray tubes and plasma display panels. These are widely used in television receivers, computer displays, and the like.

Since these displays operate by activating phosphors on a panel, the phosphor must be uniformly applied to the panel during production. If there are defects in the applied phosphor in the production process, defective pixels that do not light up will result. This type of defect will appear as a black dot on a screen display and will greatly decrease the image quality of the display.

Thus, conventionally, before the display is shipped the presence of defective pixels is checked once the phosphor is applied by checking for defective pixels through visual inspection and also by visually checking to see if there are any black dots in the completed display. If a defect is found in the phosphor applying process, all the phosphor is stripped and phosphor is re-applied.

Conventionally, when the number of pixels in electronic displays was not very high, the work involved in visual inspection was not great. However, in current high-resolution displays the number of pixels is on the order of millions of pixels. Thus, defects can be missed due to a lack of experienced inspectors or due to the aging of the inspectors.

Also, the accurate positions of defects cannot be determined since the inspection is performed visually. Thus, it is not possible to take corrective measures by applying phosphor to the defective area. Instead the phosphor has to be re-applied for the entire panel, requiring wasteful effort. Also, with visual inspection, pixel defects cannot be evaluated quantitatively and a detailed report on the defects cannot be provided. Thus, it is not possible to ship out produced displays separately according to quality based on defect status.

Since high-quality products with no defects and high image quality are desired, automated detection and correction of pixel defects in the production process is an important issue. To meet this need, inspection methods performed in the production process of electronic displays use a video camera based on a solid-state imaging elements to capture a display image. Image processing is then performed to provide automated detection of pixel defects.

This method works fine if the number of solid-state imaging elements is sufficiently higher than the number of pixels in the display. However, if there is a higher number of pixels in the display so that the number of solid-state imaging elements is close to the number of pixels on the display, moire (capture moire) patterns will be present in the captured screen.

The moire patterns are caused by insufficient resolution of the imaging elements relative to the display resolution of the display. When the captured image is sampled and processed, the signal components greater than the Nyquist frequency generate aliasing skew.

Thus, conventionally, the acquisition lens is defocused so that signal components greater than the Nyquist frequency are restricted to reduce generation of moire patterns. However, defocusing the lens also reduces the contrast of black dots, and this can reduce inspection precision due to the inability to detect small black dots and the like.

SUMMARY OF THE INVENTION

The present invention is provided to overcome the problems described above. The object of the present invention is to provide a pixel defect inspection method wherein, when an image is captured from an electronic display to inspect for defects, inspection precision is improved and pixel defects are quantitatively evaluated by reducing the generation of moire patterns and allowing defects to be easily discovered. Another object of the present invention is to provide a method for manufacturing electronic displays that allows easy correction of display defects and that allows objective evaluation of products.

In order to achieve the above objects, a first configuration of the pixel defect inspection method in electronic display production involves capturing images of the electronic display. Using the captured images, defects occurring in the pixels of the electronic display are inspected. The relative positioning of the electronic display, which is the object being captured, and an imaging element is varied by very small amounts, so that a plurality of image-capture data is obtained. The image data is combined so that image-capture moires generated from the image capture operation are reduced. Pixel defects in the electronic display are detected using the composite image.

With this inspection method, the relative positioning of the object being captured and the imaging element is offset by a fraction of the pixel pitch. This makes it easier to cancel image-capture moire and perform automatic detection of pixel defects. For example, by using an offset of ½ pixel, the phase of the image-capture moire is changed by 180 degrees. By adding the offset image and the image without the offset, moire components can be cancelled.

To provide a ½-pixel offset for the imaging element, it would be possible, for example, to have the imaging element fixed to a two-axis table using piezoelectric elements. The imaging element would be moved by very small amounts, thus providing pixel offsets. If the ½-pixel offsets are performed horizontally and vertically, the number of captured pixels is four times the original, thus providing double the resolution compared to not using offsets. This reduces moire and simultaneously increases resolution.

In order to achieve the above objects, a second configuration of the pixel defect inspection method in electronic display production involves capturing images of the electronic display. Using the captured images, defects occurring in the pixels of the electronic display are inspected. Spatially differential processing is performed on the image data obtained from the image capture operation. This allows the pixel defect positions to be determined. Defect contrast, which is defined by the ratio of the luminance of the pixel defect and the luminance surrounding the pixel defect, can be determined to provide a quantitative evaluation of the pixel defect.

With this inspection method, spatially differential processing is performed on the image without moires obtained above. The pixel defects (black dots) are then emphasized and detected, and defect contrast is determined. Additionally, the defect position, size, defect density, and the like can also be calculated automatically.

In order to achieve the objects described above, a configuration of the method for manufacturing electronic displays according to the present invention involves a method for manufacturing electronic displays in which a panel contains phosphor. Phosphor defects are inspected pixel by pixel, and extra phosphor is added to the sections where defects are found.

If the electronic display is a plasma display or a cathode-ray tube, this inspection can be performed after application of the phosphor to determine the positions of the pixels where phosphor is not applied. Thus, a micro-syringe containing phosphor can be positioned to apply corrective phosphor to the defects to eliminate pixel defects.

Also, in an inspection process where a panel is powered and lit, the inspection method described above can be used to determine the position, number, contrast, density, and the like of pixel defects. Based on these, displays can be graded objectively. By affixing a sticker indicating this information, customers can be provided high-quality displays that meet their needs.

BRIEF DESCRIPTION OF THE DRAWINGS

FIGS. 15(a), 15(b) and 15(c) show the relationship, in one dimension, between display pixels with uniform emission intensity and the pixel values of the captured images thereof.

DESCRIPTION OF THE PREFERRED EMBODIMENTS

The following is a description of a first embodiment of the present invention, with references to FIG. 1 through FIG. 14.

[Production Process and Pixel Defect Inspection Device for Electronic Displays]

First, a method for manufacturing electronic displays according to the present invention will be described, with references to FIG. 1.

Figure 1:
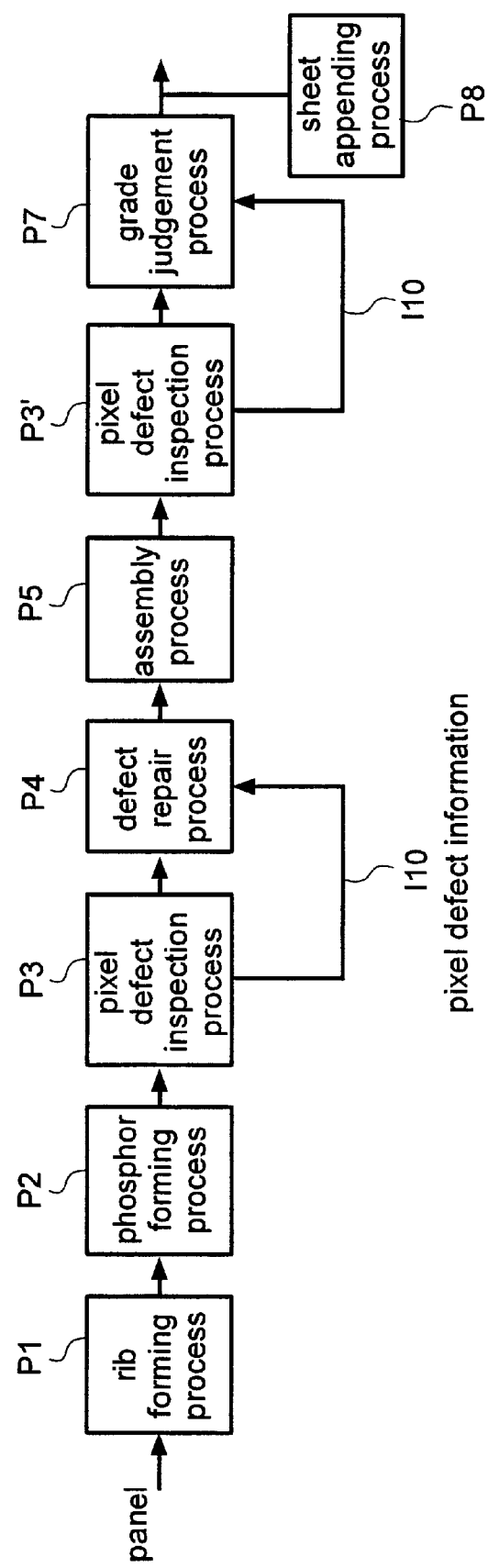
FIG. 1 is a drawing of the overall electronic display production process according to the present invention.

FIG. 1 shows the entire electronic display production process.

In this example, plasma display panels will be used, but it would also be possible to use other devices such as cathode-ray tubes. Liquid crystal displays (LCD) can also be used, but there is no pixel defect correction process for these devices.

The panel on which phosphor is applied is referred to as a back panel. Ribs (partitioning walls) for separating pixels spatially are made in a rib production process P1. Phosphor is applied between ribs (i.e., pixels) in a phosphor application process P2.

Next, an inspection is performed to determine if the phosphor was applied without defects in a pixel defect inspection process P3. A pixel defect information I10 obtained from this inspection is used in a defect correction process P4 to apply additional phosphor to the defects by using a micro-syringe or the like in the areas where the phosphor is insufficient. The pixel defect information I10 is information such as the position, size, contrast, and density of the defect. In conventional production methods, if a defect is found all the phosphor is stripped and phosphor is re-applied. With this method, only the positions where defects are present are corrected, thus contributing to improved yield.

Once defect correction is completed, an assembly process P5 takes place. In the case of plasma display panels, the back panel is assembled to a front plate and sealed and a vacuum is formed. After the assembly process 5, pixel defect inspection process P3' is performed. In this process, pixel defects are inspected automatically with the panel in a lit state. Then, the resulting pixel defect information is used in a grade judgement process P7. Grades are assigned in the following manner: panels with no defects are evaluated as grade 1; panels with one or two defects are evaluated as grade 2; and the like. Finally, an image defect inspection results sheet 8 is appended in a sheet appending process P8, and the unit is shipped. For cathode-ray tubes, the rib production process P1 is a BM (black matrix) production process, and the assembly process P5 involves the assembly of a funnel and an electron gun.

Figure 2:
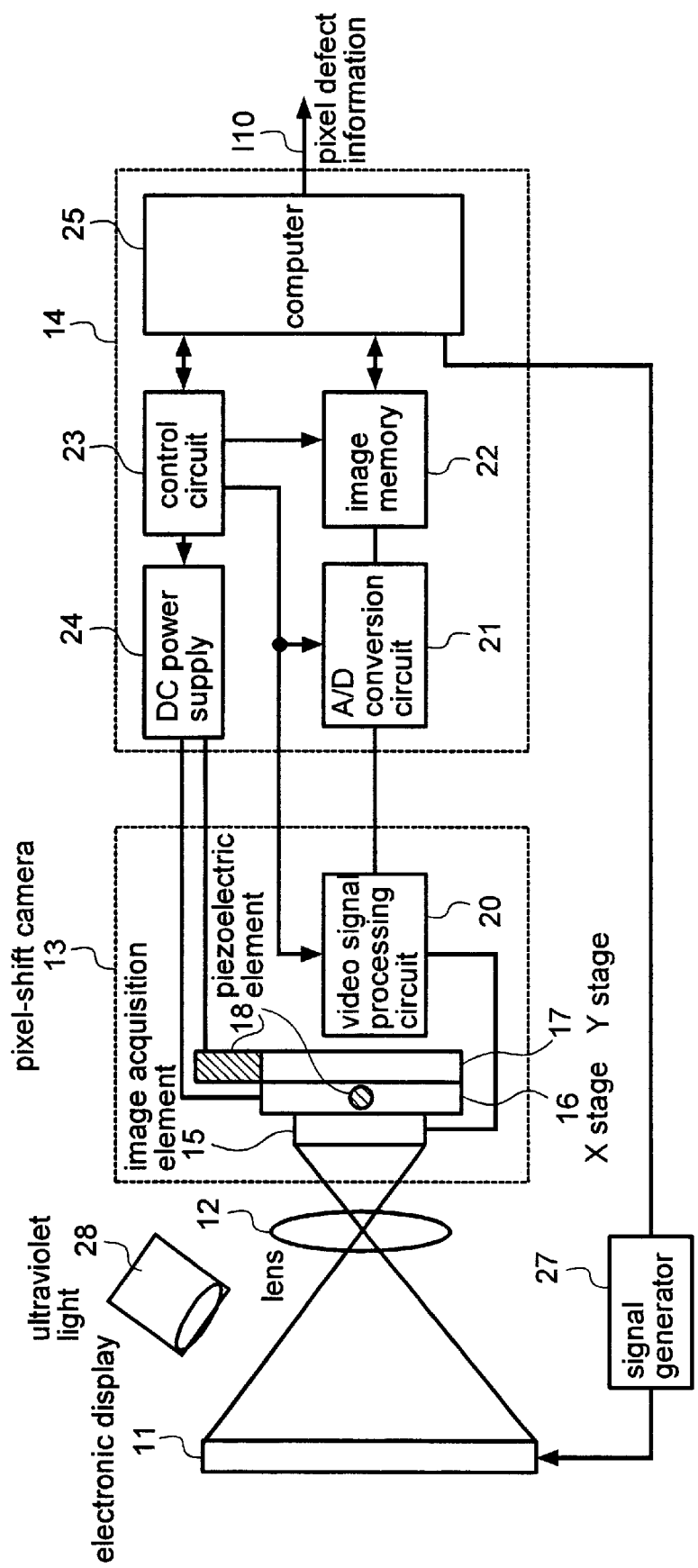
FIG. 2 is a drawing showing the structure of a pixel defect inspection device according to the present invention.

The following is a description of the structure of the pixel defect inspection device, with references to FIG. 2.

FIG. 2 shows the structure of a pixel defect inspection device according to the present invention.

This pixel defect inspection device is used in the pixel defect inspection process P3 described above.

In the first pixel inspection process P3, an ultraviolet light 28 is applied to an electronic display 11 so that the phosphor is luminescent. In the second pixel inspection process P3', inspection is performed with the panel in a lit state. A signal generator 27 lights the panel with a single color (red, green, blue) or white.

In a pixel-shift camera 13, an imaging element 15 is fixed onto an X stage 16 and a Y stage 17. Piezoelectric elements 18 are attached to both the X stage 16 and the Y stage 17. These piezoelectric elements 18 allow the X stage 16 and the Y stage 17 to be moved accurately over very small distances.

The lit state of the electronic display 11 is projected through the lens 12 and onto the imaging element 15. The output from the imaging element 15 is sent via a video signal processing circuit 20 to an image processor 14. The video signal received as input is digitized by an A/D conversion circuit 21 and is stored in an image memory 22. A computer 25 performs analysis and calculations on the contents of the image memory 22.

Based on instructions from the computer 25, a control circuit 23 is operated to control a DC power supply 24 so that the X stage 16 and the Y stage 17 can be moved predetermined distances. The control circuit 23 also provides timing control for the video signal processing circuit 20, the A/D conversion circuit 21, and the image memory 22. The computer 25 calculates the position, contrast, size, density, and the like of pixel defects and outputs the result as pixel defect information I10.

In the example shown in this figure, the relative distance between the electronic display 11 and the imaging element 15 is changed by moving the imaging element. However, it would also be possible to move the electronic display 11, move the pixel-shift camera 13, or the like.

[Pixel Defect Inspection Method]

The following is a description of a pixel defect inspection method for electronic displays according to the present invention, with references to FIG. 3 through FIG. 11.

First, an overview of the sequence of operations involved in the pixel defect inspection method for electronic displays according to the present invention will be described, with references to FIG. 3.

Figure 3:
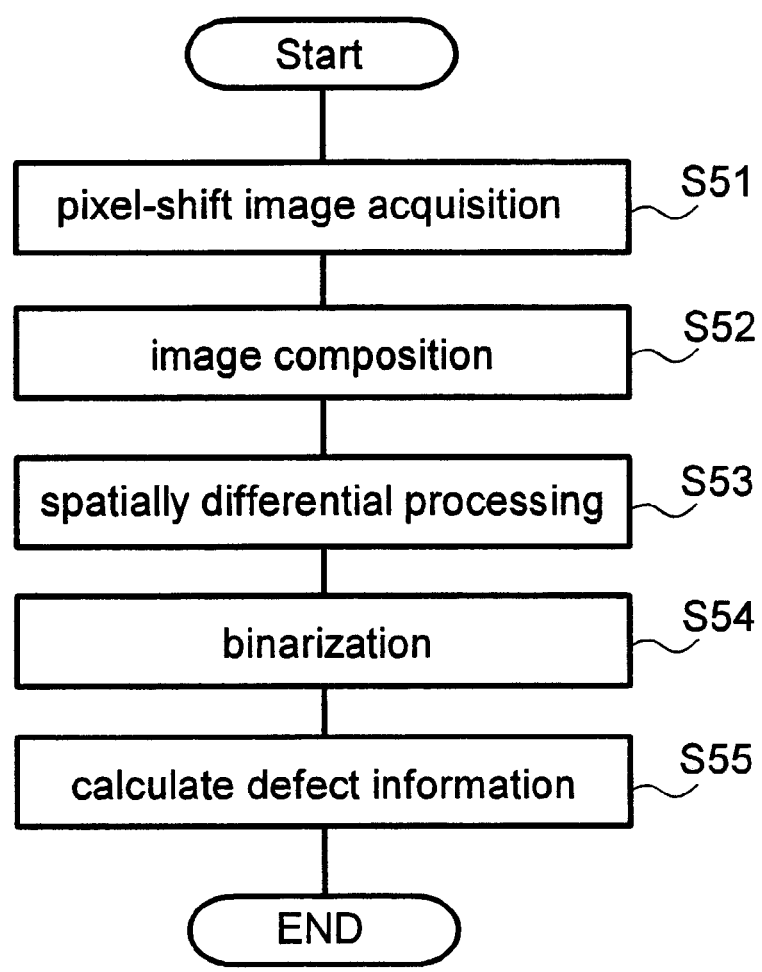
FIG. 3 is a flowchart showing the sequence of operations used in a method for inspecting pixel defects in an electronic display according to the present invention.
Figure 4:
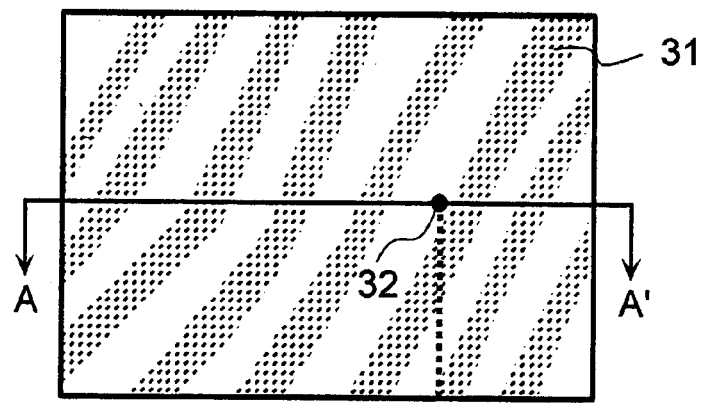
FIGS. 4(a) and 4(b) are schematic drawings showing a moire generated by an image-capture operation of a display performed during inspection.
Figure 4:
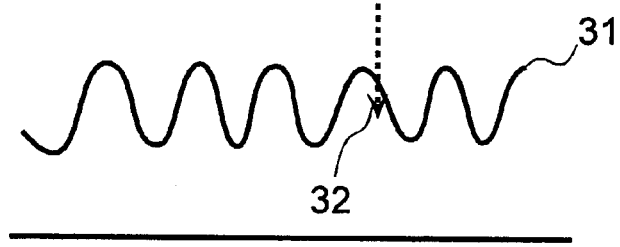
Figure 5:
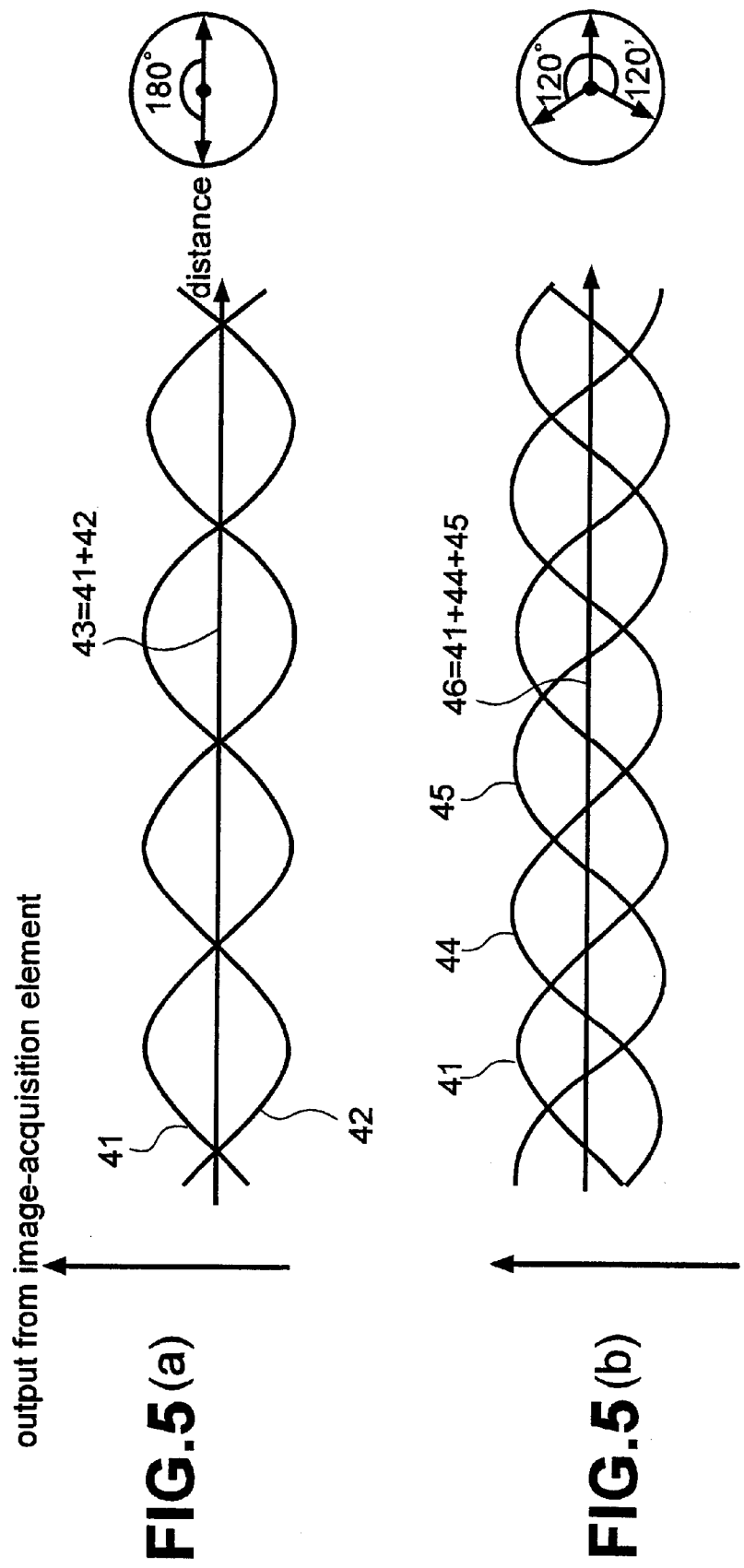
FIGS. 5(a) and 5(b) are drawings for the purpose of describing the principles behind moire elimination.

FIG. 3 is a flowchart showing the sequence of operations involved in the pixel defect inspection method for electronic displays according to the present invention.

In the pixel defect inspection method for electronic displays according to the present invention, the relative positions of the display and the imaging element is changed by a very small amount when the image is captured (S51). This is done to cancel moire patterns generated during the image capture operations for the method using the inspection device shown in FIG. 2 and the like. For example, if with ½-pixel vertical and horizontal shifts, the pixel offset image capture 51 will result in four images. Next, the plurality of acquired images is combined (S52). The combining of the separate images provides an image in which moire patterns are cancelled. The principle behind this cancelling of moire patterns is described in detail later.

Next, spatially differential processing is performed on the resulting pixel data in order to improve inspection performance (S53). The spatially differential processing process S53 is a standard image processing technology in which differences with pixel values of pixels above, below, to the left, and to the right are used to emphasize changes in pixel values. By performing this spatially differential processing process S53, pixel defects can be emphasized. Then, the spatially differentiated image is binarized (S54) and defect positions are determined. Then, defect information such as defect contrast and defect size is calculated from the composite image of step S52. The calculation of this defect information will also be described later.

(1) Principles Behind Moire Generation and Moire Elimination

The following is a description behind the generation and elimination of moire patterns, with references to FIGS. 4(a), 4(b), 5(a) and 5(b).

FIGS. 4(a) and 4(b) are schematic drawings showing a moire generated by an image-capture operation of a display performed during inspection.

FIGS. 5(a) and 5(b) are drawings for the purpose of describing the principles behind moire elimination.

If the pixel pitch of the imaging element is higher than the pixel pitch of the panel, as described above, moire is generated due to factors such as aliasing skew and the like. Various types of image-capture moire can occur depending on the acquisition magnification, the type of electronic display 1, the pixel pitch, and the like. The image-capture moire shown in FIGS. 4(a) and 4(b) has the appearance of waves on the screen. In FIG. 4(a), the areas where an image-capture moire 31 is prominent are darkened for emphasis. FIG. 4(b) shows the brightness of the screen (moire waveform) along the A-A' cross section.

If a pixel defect 32 is present on the panel, it would co-exist with the image-capture moire 31. Thus, even if image processing such as spatially differential processing is performed, the differentiated output of the image-capture moire 31 would emerge, and this is often difficult to distinguish from the differentiated output due to the pixel defect.

In order to cancel moire patterns, the object being capture, i.e., the electronic display, and the imaging element are offset from each other by a very small amount. As shown in FIG. 5(a), when a ½ pixel pitch offset is applied to a moire waveform 41, on which no pixel offset is used, the result will be a moire waveform 42 in which the phase is inverted by 180 degrees. The composite image of these will combine the original waveform 41 and the waveform resulting from the ½-pixel offset. Thus, a flat waveform 43 will be generated and the moire will be cancelled. In FIGS. 5(a) and 5(b), only one dimension is used to simplify the description, but the same principles apply in two dimensions.

Also, as shown in FIG. 5(b), using a pixel pitch offset of ⅓ results in a moire waveform 44 that has a 120 degrees phase offset from the original waveform 41, and using a pixel pitch offset of ⅔ results in a 240 degrees phase offset from the original waveform 41. Thus, in the composite image these three waveforms are combined to provide a flat waveform 46 in which the moire is cancelled out.

Similarly, when the pixel pitch is offset by 1/n, the phase is offset by 2π/n, and combining the n images will cancel out the moire so that the image-capture moire can be eliminated from the composite image.

(II) Specific Operations for Moire elimination and Defect Detection

The following is a more detailed description of how moires are eliminated based on the principles described above and how defects are discovered, with reference to FIG. 6 through FIGS. 9(a)–(c).

Figure 6:
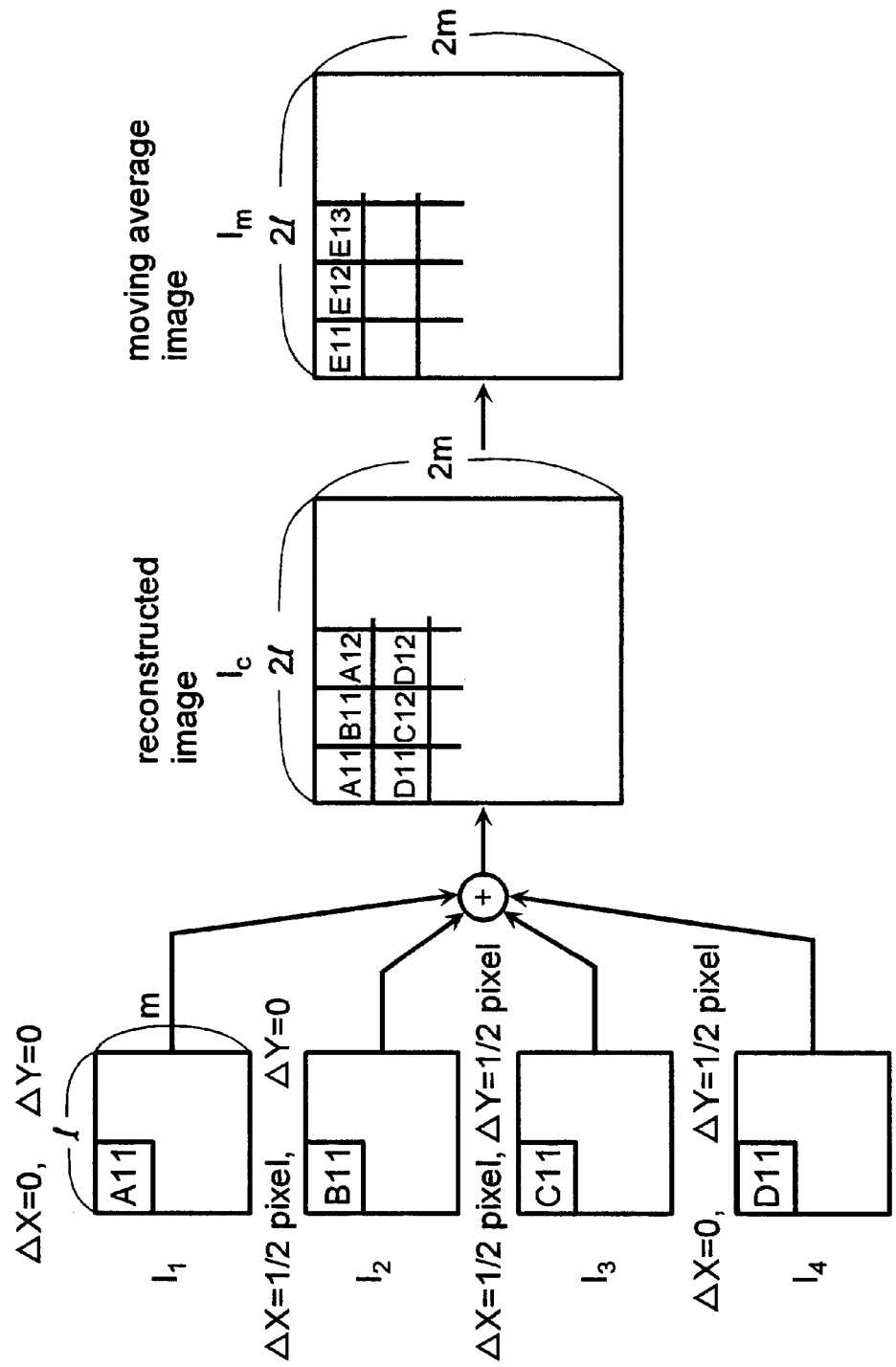
FIG. 6 is a schematic drawing for the purpose of describing the process of combining images.

FIG. 6 is a schematic drawing for the purpose of describing the process for combining images.

Figure 7:
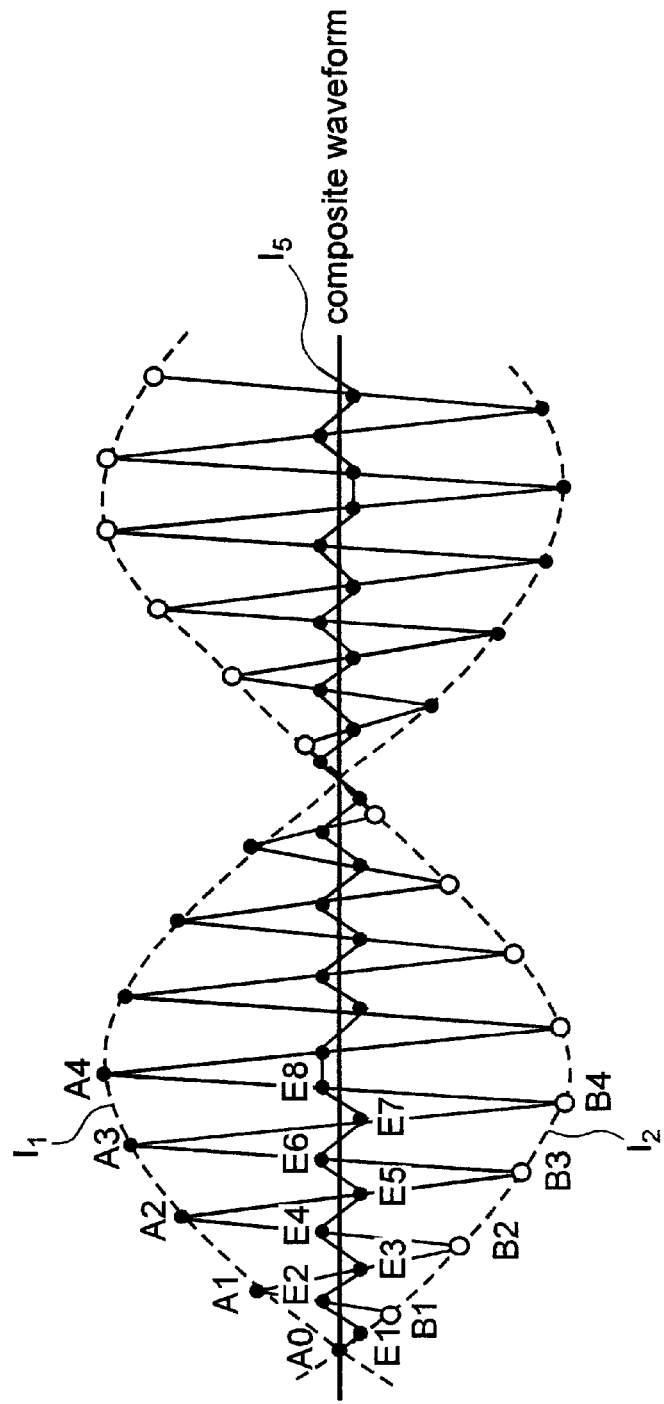
FIG. 7 shows specific examples of moire waveforms and how they are combined.

FIG. 7 is an example of moire waveforms and how they are combined.

Figure 8:
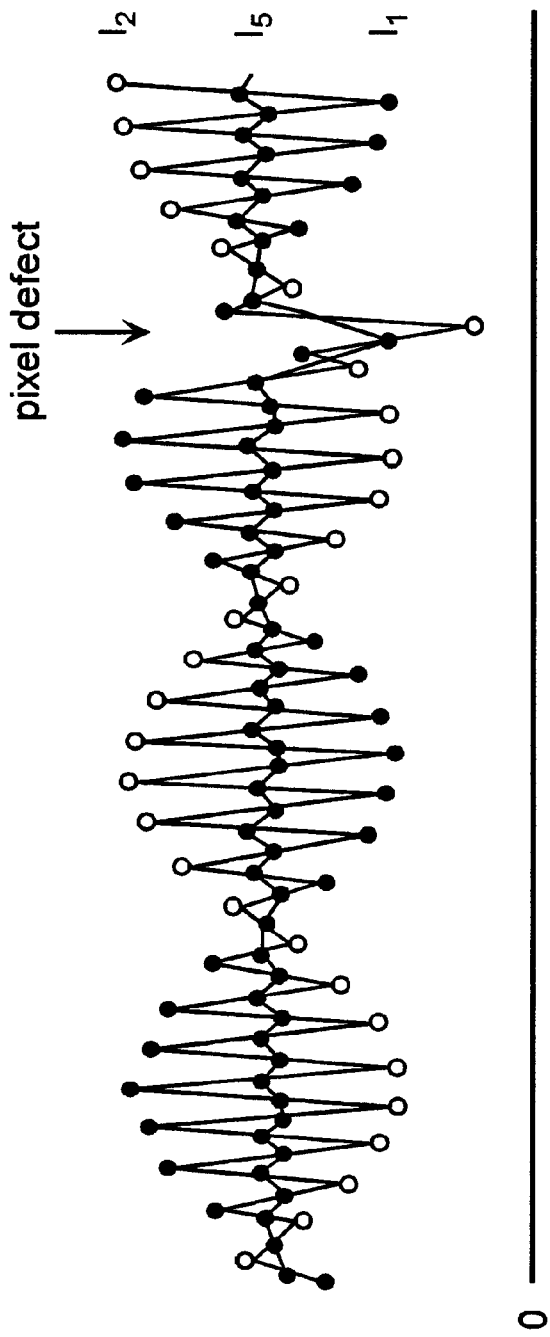
FIG. 8 is a figure showing how a pixel defect appears in a moire waveform and a composite waveform.
Figure 9:
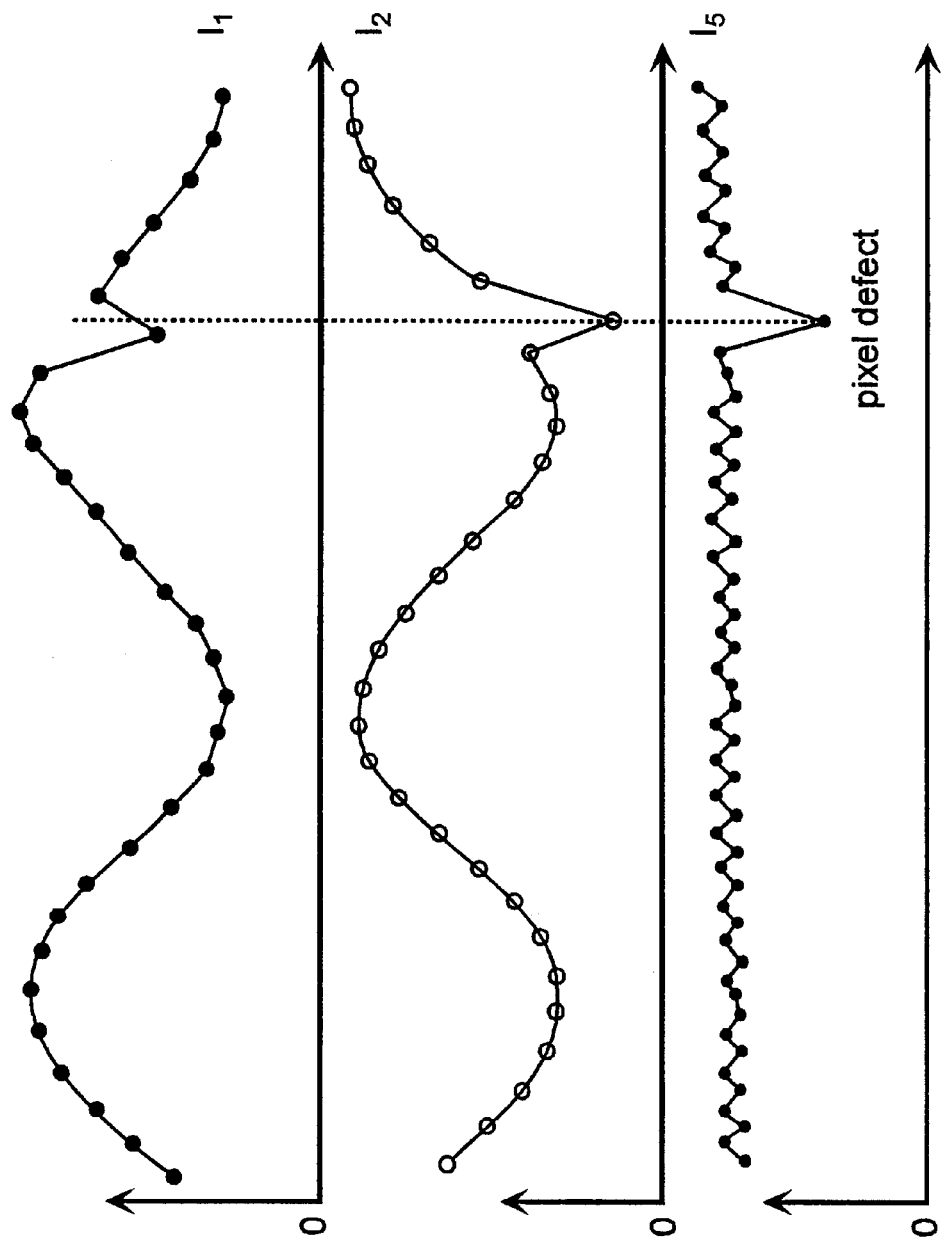
FIGS. 9(a), 9(b) and 9(c) show the waveforms from FIG. 8 separately.

FIG. 8 is a drawing showing how a pixel defect appears in moire waveforms and a composite waveform.

FIG. 9(a), 9(b) and 9(c) show the individual waveforms from FIG. 8 separately.

In this example, ½-pixel offsets are used horizontally and vertically and a composite image is produced from these offsets.

An image I1 is an image for which no pixel offset is applied (1×m pixels). An image I2 is an image resulting from applying a horizontal offset of ½ pixel to the image I1. An image I3 is an image resulting from applying horizontal and vertical offsets of ½ pixel. An image I4 is an image resulting from applying only a vertical offset of ½ pixel. These four images are combined, taking into account the direction of the offsets. This provides a high-resolution image Ic with 2¹×2 m pixels.

Since this image includes image data containing moires with inverted phases, the moires will appear to be eliminated to the human eye. This is because the resolution of the human eye is lower than that of the display, causing adjacent pixel values to be averaged.

This is not useful, so when image processing is performed, an average pixel value E11 is calculated from the average of pixel values A11, B11, C11, D11. Then, an average pixel value E12 is calculated from the average of the adjacent pixel values B11, A12, D12, C11. In this manner, the position for which the average value is to be taken is shifted sequentially, resulting in a moving average image Im. Thus, moire can be removed and a high-resolution image having four times the pixel count of the conventional method is created.

Similarly, when a composite image is generated with 1/n pixel offsets, a high-resolution image having a resolution of n squared can be generated.

In order to provide an understanding of the image processing operation, an example containing moire waveforms and a defect will be described. This example uses one dimension to simplify the description. The image data contains image-capture moire waveforms I1, I2. A composite waveform I5 is obtained by calculating points Ei+1 as the averages of the pixels from each waveform, Ai and Bi+1. By calculating the moving averages to obtain the composite waveform I5 results in the moire being significantly smaller than those of the original waveforms.

If a pixel defect is present, as shown in FIG. 8, that section will be dark, with a low output. FIGS. 9(a), 9(b) and FIG. 9(c) show this in each of the individual waveforms. While detecting the defect in the waveforms I1 and I2 is difficult, the waveform I5 results from taking the moving averages allows the defect to be detected even with a simple operation such as binarization, thus allowing inspection precision t be improved. Furthermore, since the resolution is double, as described above, the defect can be found more easily and this also improves inspection precision.

(III) Defect Contrasts in the Defect Information Calculation Operation

Figure 10:
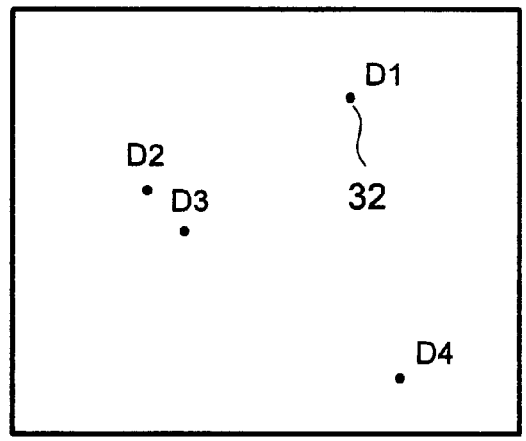
FIG. 10 is a schematic drawing showing defects generated in a panel.
Figure 11:
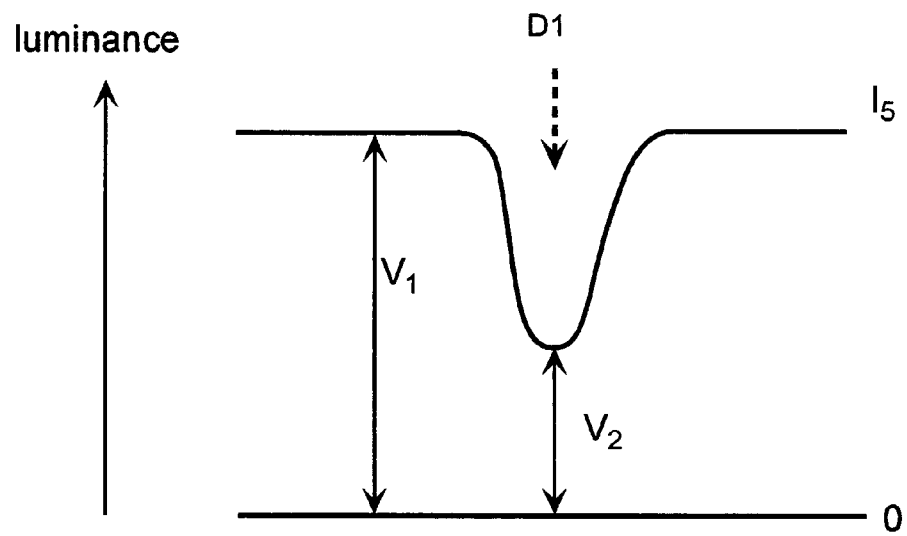
FIG. 11 is a drawing showing luminances of a defect and the surrounding area.

The following is a description of defect contrasts in the defect information calculation operation, with references to FIG. 10 and FIG. 11.

FIG. 10 is a schematic drawing showing defects on a panel.

FIG. 11 is a drawing showing the luminance values of a defect and the surrounding area thereof.

In this example, the spatially differential processing process S53 and the binarization process S54 are performed, and a defect position on the panel is discovered, as shown in FIG. 10. For example, if the defect position of a defect D1 is determined, the luminance values surrounding the defect are measured, as shown in FIG. 11, and a defect contrast operation is performed. This defect contrast operation can, for example, be defined using (Equation 1) shown in FIG. 11. Here, V1 is a luminance value for an area without defects, and V2 is the luminance value (the minimum value) of the defect position. According to this definition, if there is no defect the result will be 0%. If the extent of the defect is significant, the defect contrast value will also be greater, thus allowing quantitative evaluation of the defect.

[Correction of Defects in the Defect Correction Process]

The following is a description of the defect correction operation performed in the defect correction process P4, with references to FIGS. 12(a), 12(b), 13(a) and 13(b).

Figure 12A:
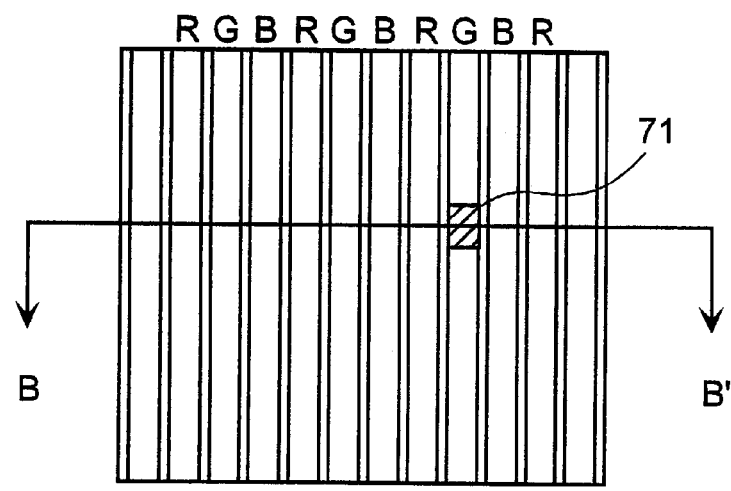
FIGS. 12(a) and 12(b) are drawings showing a phosphor defect 71 generated during a phosphor application process P2 for a plasma display panel.
Figure 12B:

FIGS. 12(a) and 12(b) show an example where a phosphor defect 71 has taken place during the phosphor application process P2 for a plasma display panel. FIG. 12(a) is a top-view drawing, and FIG. 12(b) is a cross-section drawing along the B-B' line.

Figure 13A:
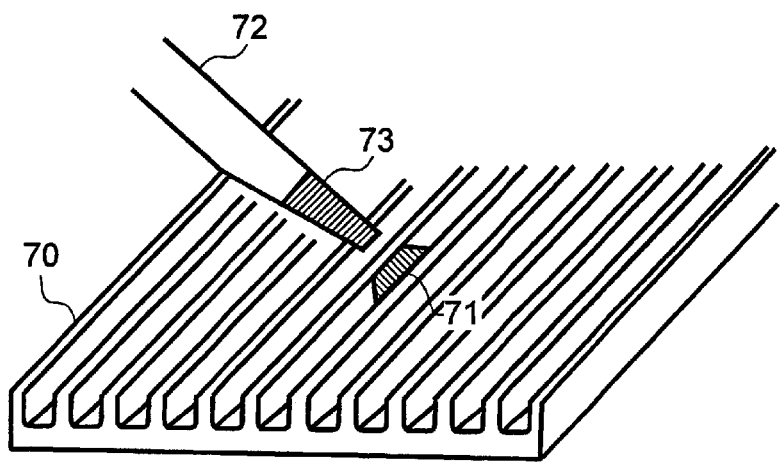
FIGS. 13(a) and 13(b) are drawings showing how a defect is corrected in the phosphor correcting process.
Figure 13B:
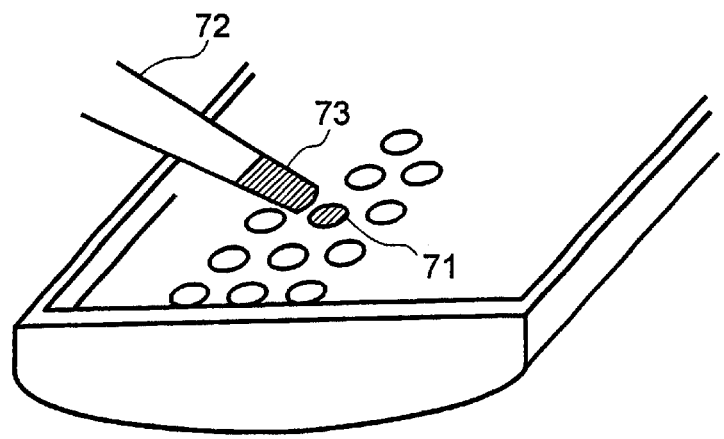

FIGS. 13(a) and 13(b) show how the defect is corrected in the phosphor correction process. FIG. 13(a) is a perspective drawing showing the correction operation for a striped panel such as a plasma display panel. FIG. 13(b) is a perspective drawing showing the same for a dotted panel such as a CRT. A micro-syringe 72 containing a phosphor 73 is used to correct the inadequate phosphor 70 at the phosphor defect 71.

[Pixel Defect Inspection Results Sheet]

Finally, the pixel defect inspection results sheet attached when shipping the product will be described, with references to FIG. 14.

Figure 14:
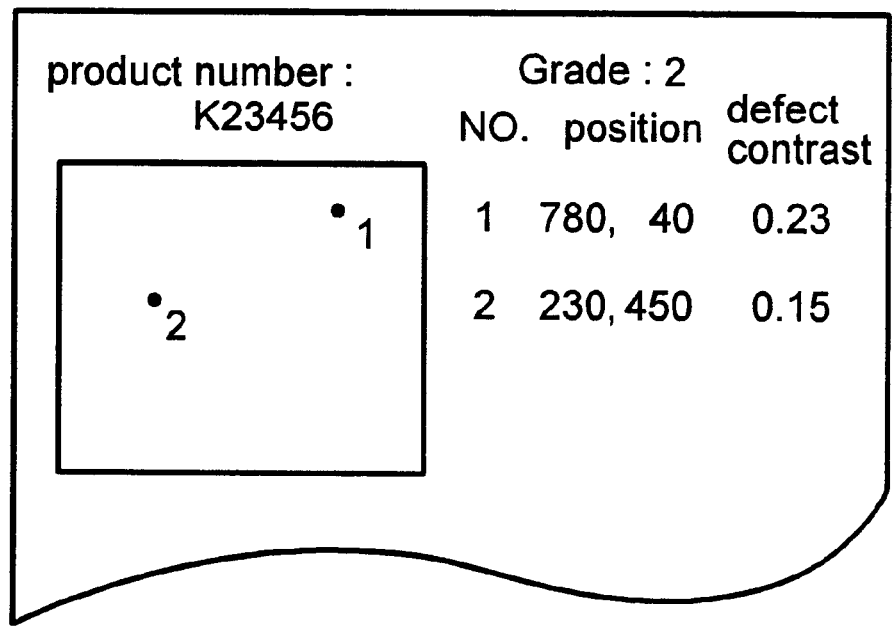
FIG. 14 is a drawing showing an example of a pixel defect inspection results sheet.

FIG. 14 is a drawing showing an example of a pixel defect inspection results sheet.

When products are shipped, the information obtained from the inspections is indicated on a pixel defect inspection results sheet for each display. This example includes indications of grade, pixel defect positions, and defect contrast, which indicate the extent of the defects.

As a result, flexible handling of products is made possible, such as varying the product prices based on the grade of the product. This is a useful measure in practice since, with the increased demands for precision in displays, there are times when products must be shipped with defect tolerances within a range that does not obstruct practical usage.

The following is a description of a second embodiment of the present invention, with references to FIGS. 15(a)–(d) through FIG. 22. FIGS. 15(a)–15(d) show the relationships between display pixels with uniform emission intensity and the pixel values from the captured image thereof. These relationships are expressed in one dimension in this figure. The display pixel pitch is set to Hp=1 and the light emission width is set to αHp, where α corresponds to the aperture rate of the display pixels. In this example, α=0.6. The captured pixels have a pitch p=0.6. Captured pixel values B1–B9 represent the captured pixel values A1–A9 offset by 0.5 Hp, i.e., ½ the display pixel pitch.

The composite captured pixel values C1–C10 are determined by taking the average for each pixel of the original captured image and the captured image with a ½-pitch offset, e.g., C1=(A1+B1)/2, C2=(A2+B2)/2, . . . , C10=(A10+B10)/2. In the embodiment described above, it is stated, "when a ½ pixel pitch offset is applied to a moire waveform 41, on which no pixel offset is used, the result will be a moire waveform 42 in which the phase is inverted by 180 degrees. The composite image of these will combine the original waveform 41 and the waveform resulting from a ½-pixel offset. Thus, a flat waveform 43 will be generated and the moire will be cancelled." While the moire in the composite image will be limited, the moire will not be completely cancelled in this example. The following is an explanation of why this is so and a description of how the moire can be completely cancelled.

Figure 16:
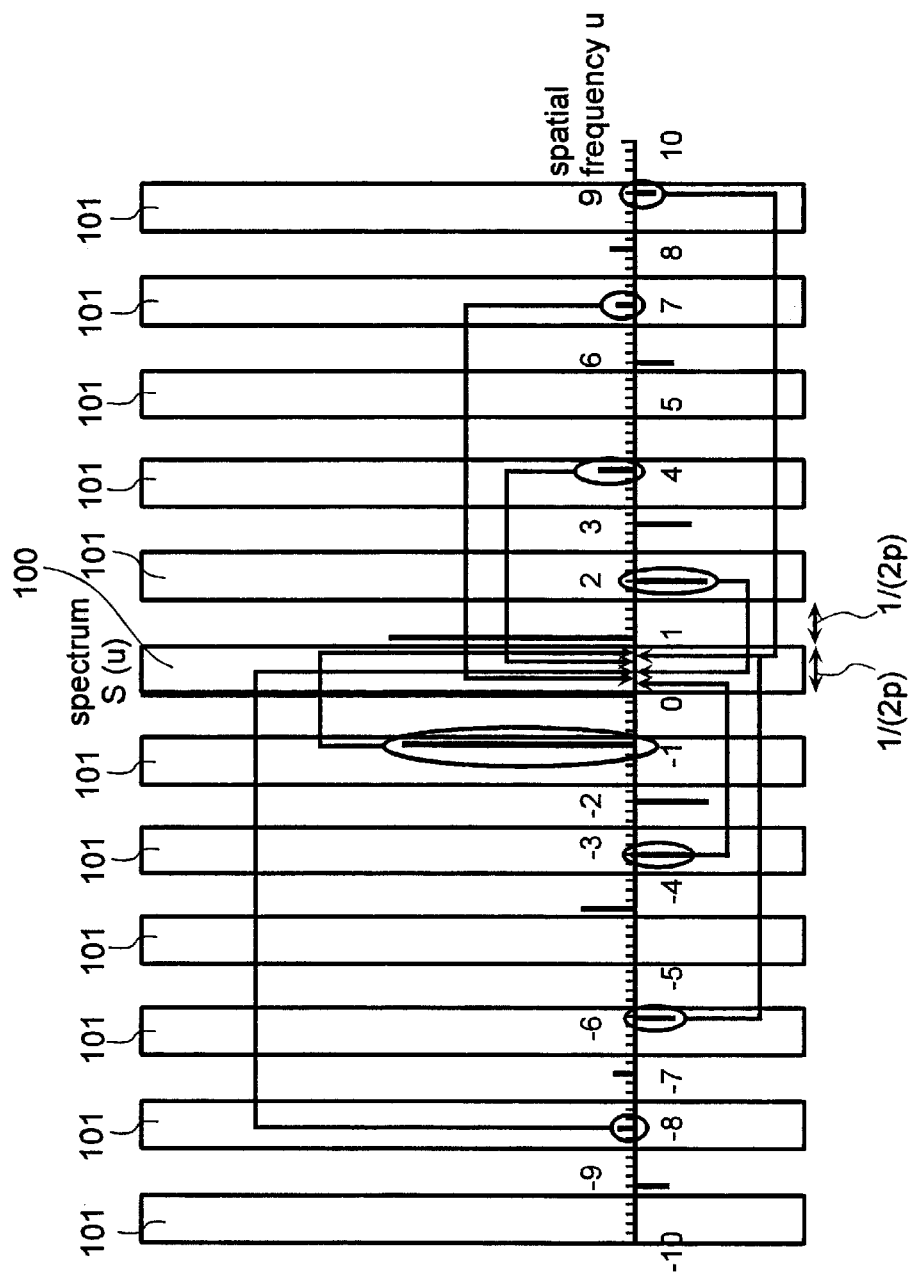
FIG. 16 is a drawing showing the relation between spatial frequency and spectrum based on the image-capture conditions from FIG. 15.

FIG. 16 shows a Fourier transform of the capture conditions from FIGS. 15(a)–15(d). A spatial frequency u is an inverse of the horizontal axis "position" in FIGS. 15(a)–15(d). The vertical axis in FIG. 16 is a spectrum S(u) indicating the extent of the corresponding spatial frequency component. Generally, this takes a complex number, but since the imaginary portion is zero, the value will be a real number.

The following is an explanation of the mechanisms involved in the formation of moires. A section 100, where the spatial frequency u=0–1/(2p), is superimposed with a section 101. The section 101 has a width 1/(2p) and is N/p units away from section 100, where N is an integer. If a non-zero spectrum is present in the section 101, a moire is formed having a spatial frequency corresponding to the spatial frequency of the non-zero spectrum in the range 0–1/(2p) of the section 100.

In FIG. 16, the spectra causing the moire is indicated by ovals, arrows indicate the moire spatial frequencies in the spatial frequency range of 0–1/(2p), and the correspondence between the two are shown.

Figure 18:
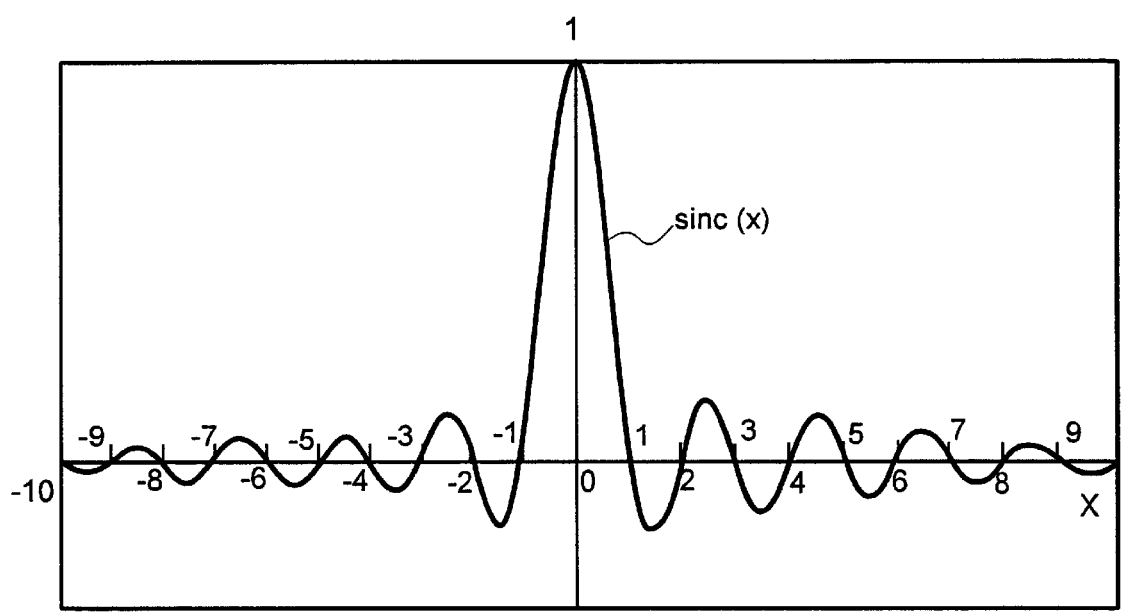
FIG. 18 is a drawing showing the waveform of the sinc (x) function.

With the capture conditions from FIG. 15 FIGS. 15(a)–15(d), the strength of the moires is the product of sinc (pu')=sin (Πpu')/(Πpu') and the non-zero spectrum value, where u' is the spatial frequency of the non-zero spectrum in the section 101. As shown in FIG. 18, as |x| is increased, the sinc (x) shows damped oscillation. Thus, as the |u'| of the non-zero spectrum in the section 101 increases, the resulting moire will be weaker.

Figure 17A:
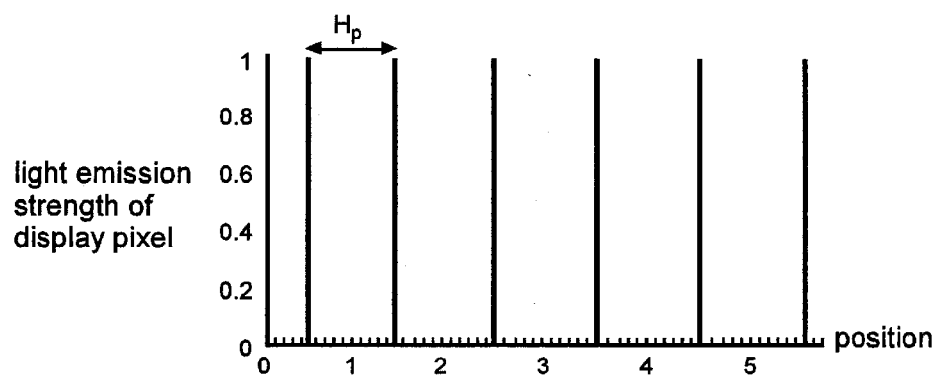
FIGS. 17(a) and 17(b) show the emission intensity of display pixels when the display pixel aperture rate is infinity approaching zero and the corresponding relationship between spatial frequency and spectrum.
Figure 17B:
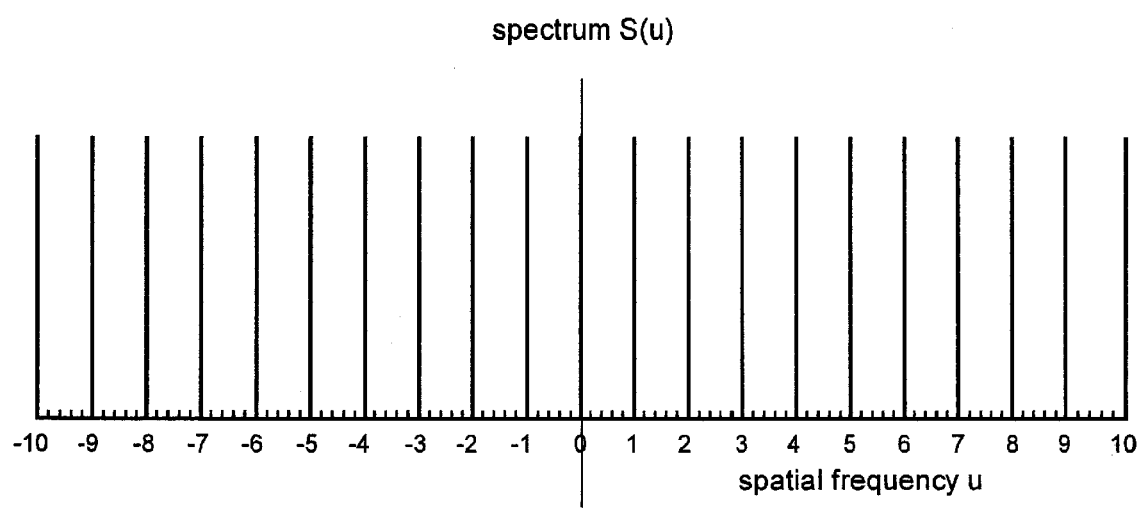

FIGS. 17(a) and 17(b) show the emission intensity of display pixels when α is infinitely approaching zero and the corresponding spectra. Unlike what is shown in FIG. 16, the spectra values stay constant and do not diminish regardless of the value of |u'|. The influence of the display pixel aperture rate is determined by multiplying sinc (αu) to the spectra in FIGS. 17(a) and 17(b). It is obvious that the results are identical to the spectra in FIG. 16.

When Hp=1 and display pixels captured with 0, 1/n, . . . , (n−1)/n offsets are averaged, the resulting spectrum is the spectrum shown in FIGS. 17(a) and 17(b) multiplied by (Equation 2).

$$\sum_{k=0}^{n-1} e^{j\frac{2ku}{n}\pi} \qquad \text{(Equation 2)}$$

Figure 19:
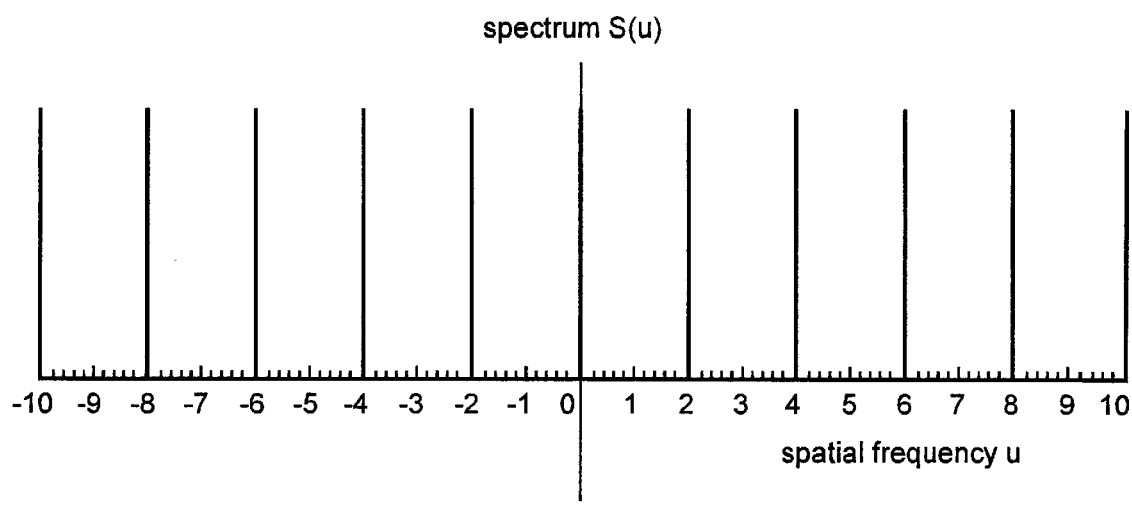
FIG. 19 is a drawing showing the relationship between spatial frequency and spectrum when averaging is performed with 0- and ½-pitch offsets.
Figure 20:
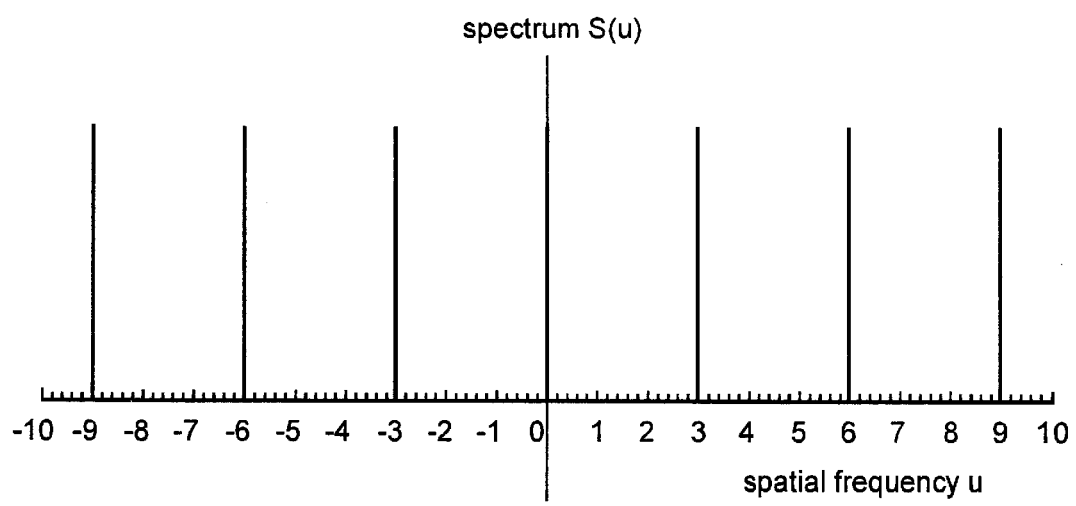
FIG. 20 is a drawing showing the relationship between spatial frequency and spectrum when averaging is performed with 0-, ⅓-, and ⅔-pitch offsets.

FIG. 19 is the spectrum resulting from averaging 0 and ½ offsets. All spectra except those where 2k, k=integers will be zero. FIG. 20 is the spectrum resulting from averaging 0, ⅓. And ⅔ offsets, and all spectra except those where 3k, k=integers will be zero. In general, for offsets 0, 1/n, . . . , n−1/n, spectra other than nk, k=integer will be zero. If sinc (αnk)=0 for the spatial frequency nk of the non-zero spectra remaining after the offset averaging described above, then the moire is completely cancelled. This can be achieved with an n where αn=a positive integer. Considering the implementation costs, an n that provides the smallest αn should be selected. In the examples shown in FIG. 15 and FIG. 16, α=0.6 so if n=5, i.e., the average is calculated for offsets of 0, ⅕, ⅖, ⅗, and ⅘, then the moire can be completely cancelled.

Figure 21:
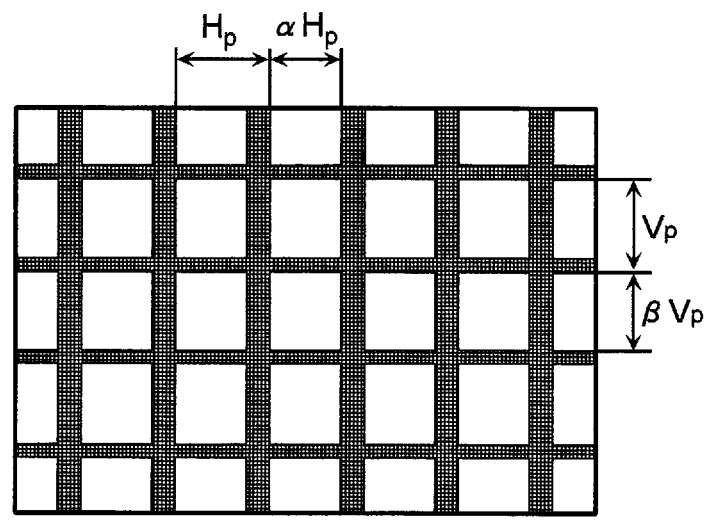
FIG. 21 is a drawing showing a rectangular arrangement of rectangular pixels.
Figure 22:
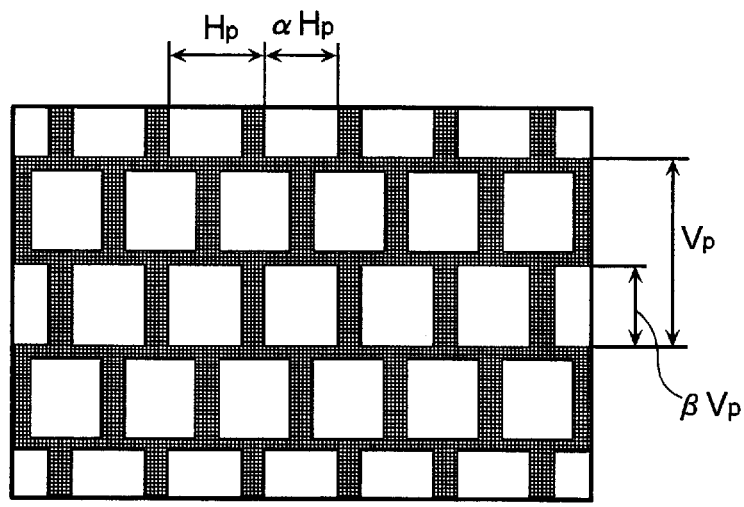
FIG. 22 is a drawing showing a triangular arrangement of rectangular pixels.

To handle two dimensions, if the display pixels are rectangular in shape as shown in FIG. 21 and FIG. 22, then the horizontal axis and the vertical axis can be treated independently. This is clear from the fact that the influence of the display pixel aperture rate in one dimension, sinc (αu) is sinc (αHpu)×sinc (βVpv) in two dimensions. Here, α is the horizontal display pixel aperture rate, β is the vertical display pixel aperture rate, Hp is the horizontal pitch, and Vp is the vertical pitch. Also, u is the horizontal spatial frequency and v is the vertical spatial frequency.

FIG. 21 is an example showing a pixel arrangement (rectangular arrangement) used in plasma displays and liquid crystal displays. FIG. 22 is an example showing a pixel arrangement (triangular arrangement) used in cathode-ray tubes. In either case, the method described above can be used to determine a value of n that completely cancels moires horizontally and vertically regardless of the pixel arrangement.

Figure 23:
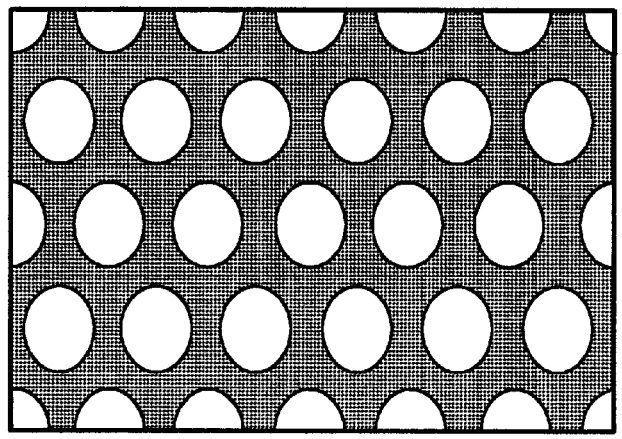
FIG. 23 is a drawing showing a triangular arrangement of elliptical pixels.
Figure 24:
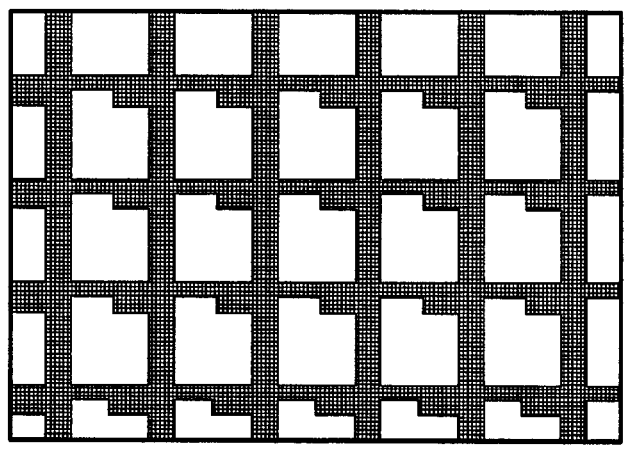
FIG. 24 is a drawing showing a rectangular arrangement of keyhole-shaped pixels.

If the shape of the display pixel is not rectangular, the influence of the display pixel opening aperture cannot be represented by a sinc function. Thus, a value of n that can completely cancel moires cannot be determined. FIG. 23 shows elliptical pixels (which can be represented by a one-dimensional Bessel function). Pixels used in standard cathode-ray tubes generally have shapes close to these. FIG. 24 shows key-hole shaped pixels used in liquid crystal displays, and with these the influence of the display pixel aperture rate cannot be analytically expressed with functions.

Figure 25:
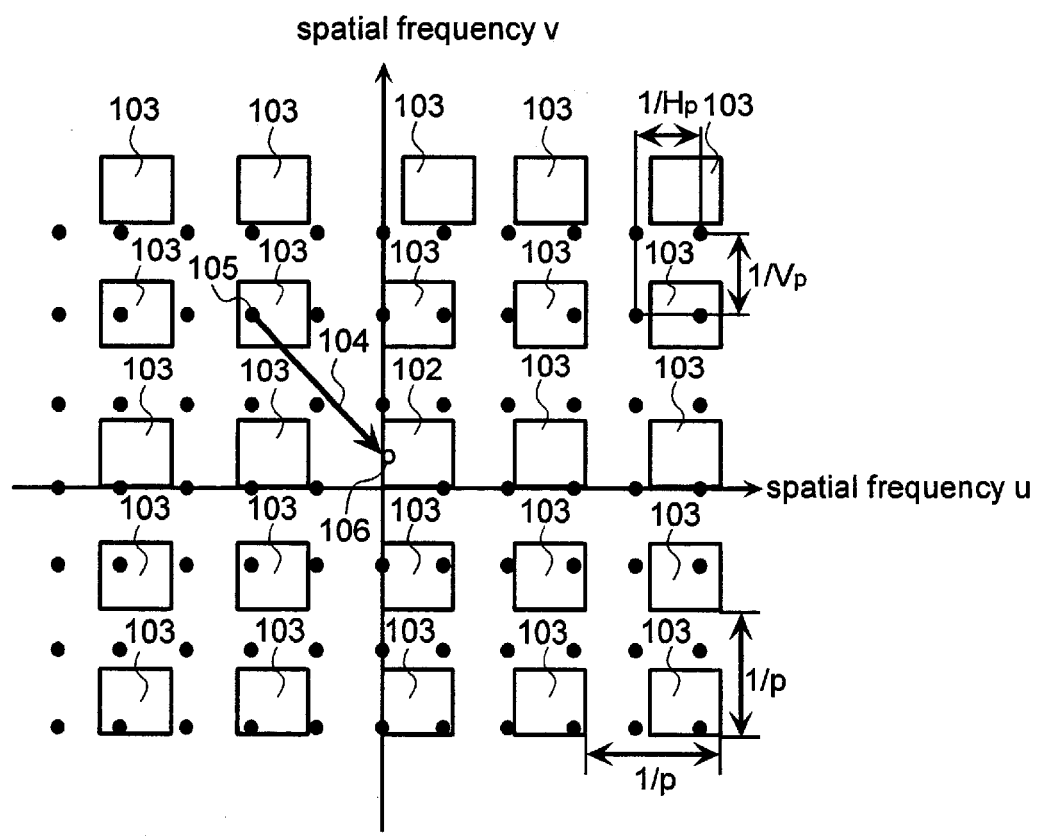
FIG. 25 is a drawing showing the mechanism by which moires are generated when the display pixel arrangement is a rectangular arrangement.
Figure 26:
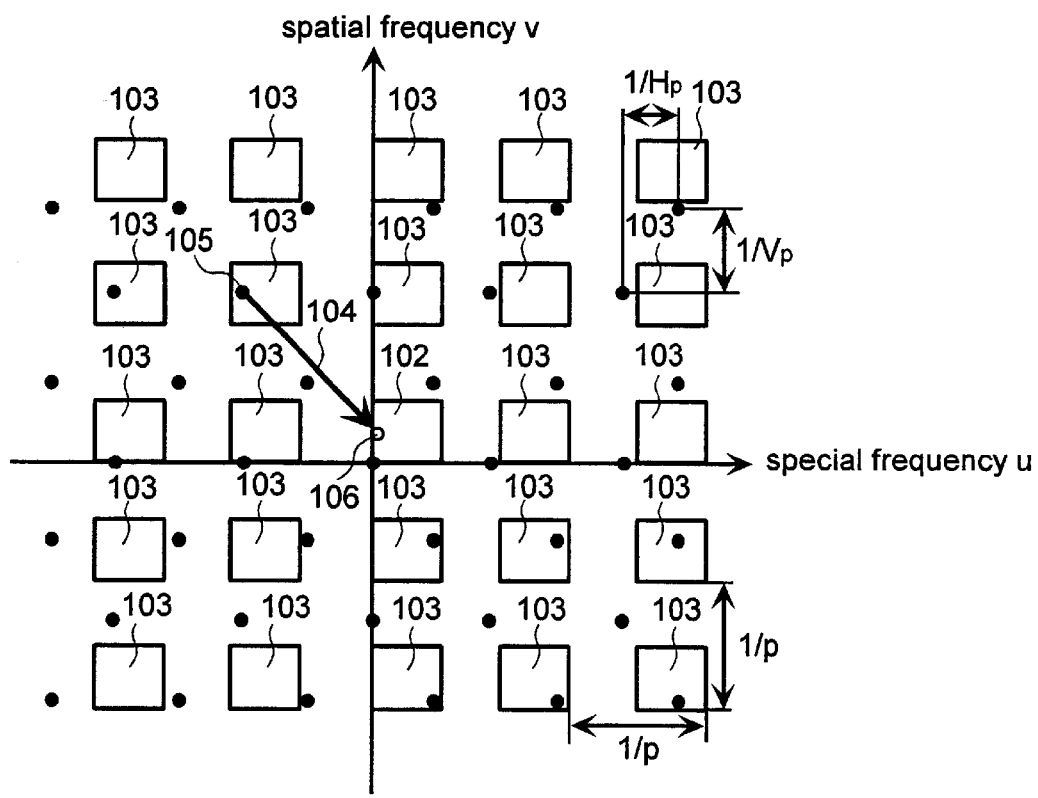
FIG. 26 is a drawing showing the mechanism by which moires are generated when the display pixel arrangement is a triangular arrangement.
Figure 27:
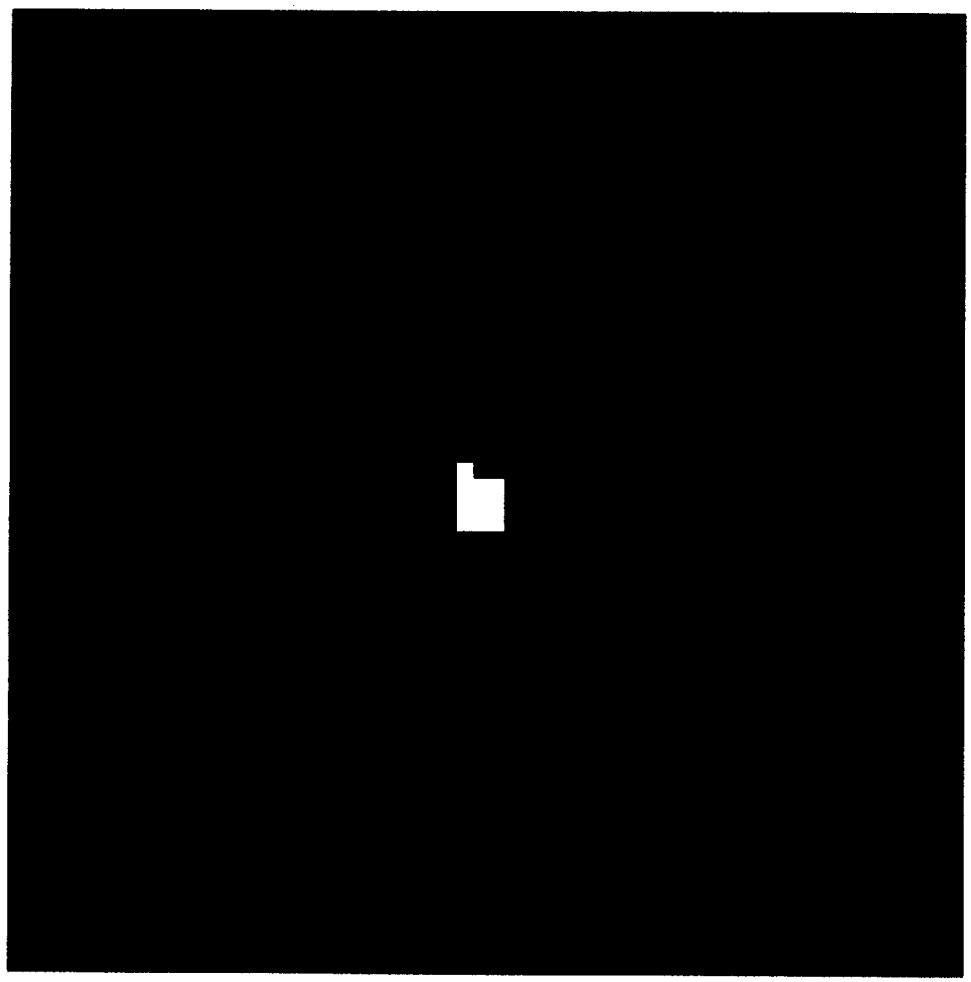
FIG. 27 is a drawing showing an example of image data used to quantify the influence of the display pixel aperture rate.

The following is a different embodiment of the present invention for pixel shapes in which the influence of the display pixel aperture rate is not a sinc function, with references to FIG. 25 through FIG. 27.

FIG. 25 is a drawing showing the mechanism by which moires are formed when display pixels are arranged in a rectangular arrangement. FIG. 26 is a drawing showing the mechanism by which moires are formed when display pixels are arranged in a triangular arrangement. The horizontal and vertical pitch of the captured pixels are set to p. The horizontal pitch Hp and the vertical pitch Vp of the display pixels are according to what is defined for FIG. 21 and FIG. 22. The black dots in FIG. 25 and FIG. 26 correspond to the coordinate points of the spatial frequencies (u, v) where the spectra are non-zero based on the display pixel arrangement.

The following is an explanation, corresponding to the explanation for the example in one-dimension shown in FIG. 16, of how moires are generated in FIG. 25 and FIG.

26. A section 102, with spatial frequencies u=0–1/(2p), v=0–1/(2p), is combined with a section 103 having a horizontal width and a vertical width of 1/(2p) and which is separated from u by N/p, where N=integer, and from v by M/p, where M=integer. If a non-zero spectrum is present in the section 103, a moire is formed with a spatial frequency corresponding to the spatial frequency of the non-zero spectrum in the section 102 with the spatial frequency range u=0–1/(2p) and v=0–1/(2p). For example, a non-zero spectrum 105 in FIG. 21 and FIG. 22 becomes the moire spectrum having the spatial frequency of a non-zero spectrum 106 due to an aliasing 104.

The strength of the resulting moire is proportional to the product of the influence of the display pixel aperture rate at the spatial frequency (u', v') of the non-zero spectrum in the section 103 and sinc (pu')×sinc (pv'). As |u'| or |v'| increases, the strength of the moire decreases.

By quantifying the influence of the display pixel aperture rate beforehand, the spectrum in the moire spectrum 106 with the maximum strength can be calculated. Furthermore, it is also possible to determine through calculations the spatial frequency $(u'_1, v'_1)$ of the non-zero spectrum 105 in the section 103 corresponding to the maximum moire spectrum 106. Similarly, the spatial frequency $(u'_2, v'_2)$ of the non-zero spectrum 105 in the section 103 corresponding to the second strongest moire spectrum can be determined.

Since the pixel offset for inverting the phase of the moire spectrum by 180 degrees is $\exp\{j2\pi p(\eta u' + \xi v')\} = -1$, $\eta$ and $\xi$ for cancelling the moire spectra corresponding to $(u'_1, v'_1)$ and $(u'_2, v'_2)$ can be uniquely determined by the simultaneous linear equations shown in (Equation 3). Here, in the pixel offset ratio $\eta$, $\xi$ of (Equation 3), is the ratio corresponding to the image-capture pixel pitch p.

$$\eta u'_1 + \xi v'_1 = \frac{1}{2p} \quad \text{(Equation 3)}$$
$$\eta u'_2 + \xi v'_2 = \frac{1}{2p}$$

The following is a description of a method used to quantify the influence of the display pixel aperture rate. The keyhole-shaped pixels of the liquid crystal display from FIG. 24 is used as an example. As shown in FIG. 27, image data containing one keyhole-shaped pixel of an appropriate size is created. In the image data, all values other than the keyhole-shaped pixel are set to zero, and the keyhole-shaped pixel is positioned roughly at the center of the image data. A Fourier transform is performed on this image data to calculate the spectrum data (complex numbers) for spatial frequencies. The spectrum from the display pixel arrangement from FIG. 25 and FIG. 26 are multiplied with the spectrum data of the corresponding spatial frequencies to quantify the influence of the display pixel aperture rate.

In this embodiment, the selection criterion for moires to be cancelled is based on the strength of the moires, but the present invention is not restricted to this and selection criteria can be freely determined. For example, it would also be possible to cancel moires having predetermined spatial frequency components.

When capturing an image from an electronic display and inspecting for defects, the present invention provides a pixel defect inspection method that reduces the generation of moires, that improves inspection precision by allowing defects to be discovered easily, and that allows quantitative evaluation of these pixel defects. The present invention also provides a method for manufacturing electronic displays that allows display defects to be easily corrected and that allows objective evaluation of products.

What is claimed is:

1. A method for detecting pixel defects in electronic display equipment comprising:

capturing images of a display screen of said electronic display equipment using imaging means while changing, by very small amounts, relative positioning between said display screen of said electronic display equipment and an imaging element of said imaging means, and obtaining a plurality of image data for said display screen;

combining said plurality of image data and creating composite image data in which image-capture moires contained in each of said plurality of image data is reduced; and inspecting pixel defects on a display surface of said electronic display equipment using said composite image data;

wherein said composite image to be inspected is an image in which images offset by i/n of said pixel pitch are used to create an image having a resolution that is greater by a factor of n, both horizontally and vertically, than the original image data, and moving averages are taken sequentially for pixel values in said created image to form an image that is greater by a factor of n, both horizontally and vertically, than said original image data.

2. A method as described in claim 1, wherein said changing relative positioning is performed with changes in a horizontal and/or a vertical direction.

3. A method as described in claim 1, wherein said changing relative positioning is performed by moving said imaging element.

4. A method as described in claim 1, wherein said changing relative positioning is performed by moving said electronic display, which is the object being captured.

5. A method as described in claim 1, wherein said changing relative positioning is performed by moving an entire camera mechanism containing said imaging element.

6. A method as described in claim 1, wherein:

in said changing relative positioning, out of spatial frequencies of an image-capture moire generated from an original image during a single very small movement, one or two different image-capture moire spatial frequency components are phase-inverted 180 degrees; and in said obtaining said composite image data, said images obtained from said changing relative positioning are combined with said original image.

7. An apparatus for detecting pixel defects in electronic display equipment comprising:

means for capturing images of a display screen of said electronic display equipment using imaging means while changing, by very small amounts, relative positioning between said display screen of said electronic display equipment and an imaging element of said imaging means, and obtaining a plurality of image data for said display screen;

means for combining said plurality of image data and creating composite image data in which image-capture moires contained in each of said plurality of image data is reduced; and means for inspecting pixel defects on a display surface of said electronic display equipment using said composite image data;

wherein said composite image to be inspected is an image in which images offset by i/n of said pixel pitch are used to create an image having a resolution that is greater by a factor of n, both horizontally and vertically, than the original image data, and moving averages are taken sequentially for pixel values in said created image to form an image that is greater by a factor of n, both horizontally and vertically, than said original image data.

8. An apparatus as described in claim 7, wherein said changing relative positioning is performed with changes in a horizontal and/or a vertical direction.

9. An apparatus as described in claim 7, wherein said changing relative positioning is performed by moving said imaging element.

10. An apparatus as described in claim 7, wherein said changing relative positioning is performed by moving said electronic display, which is the object being captured.

11. An apparatus as described in claim 7, wherein said changing relative positioning is performed by moving an entire camera mechanism containing said imaging element.

12. An apparatus as described in claim 7, wherein:
in said changing relative positioning, out of spatial frequencies of an image-capture moire generated from an original image during a single very small movement, one or two different image-capture moire spatial frequency components are phase-inverted 180 degrees; and in said obtaining said composite image data, said images obtained from said changing relative positioning are combined with said original image.

13. An apparatus for detecting pixel defects in electronic display equipment comprising:

an image capturing unit to capture images of a display screen of said electronic display equipment using a sensor array while using a displacing unit to change, by very small amounts, relative positioning between said display screen of said electronic display equipment and sensors of said sensor array, and obtaining a plurality of image data for said display screen;

a composite processing unit to combine said plurality of image data and create composite image data in which image-capture moires contained in each of said plurality of image data is reduced; and a pixel defect detecting unit to detect pixel defects on a display surface of said electronic display equipment using said composite image data;

wherein said composite image to be inspected is an image in which images offset by ion of said pixel pitch are used to create an image having a resolution that is greater by a factor of n, both horizontally and vertically, than the original image data, and moving averages are taken sequentially for pixel values in said created image to form an image that is greater by a factor of n, both horizontally and vertically, than said original image data.

14. An apparatus as described in claim 13, wherein said displacing unit changes relative positioning in a horizontal and/or a vertical direction.

15. An apparatus as described in claim 13, wherein said displacing unit changes relative positioning by moving said imaging element.

16. An apparatus as described in claim 13, wherein said displacing unit changes relative positioning by moving said electronic display, which is the object being captured.

17. An apparatus as described in claim 13, wherein said displacing unit changes relative positioning by moving an entire camera mechanism containing said imaging element.

18. An apparatus as described in claim 13, wherein:
in the change of said relative positioning, out of spatial frequencies of an image-capture moire generated from an original image during a single very small movement, one or two different image-capture moire spatial frequency components are phase-inverted 180 degrees; and in combining to said composite image data, said images obtained from said changing relative positioning are combined with said original image.

* * * * *